United States Patent

Sugiyama et al.

[11] Patent Number: 5,961,312
[45] Date of Patent: Oct. 5, 1999

[54] COMBUSTION BURNER AND COMBUSTION METHOD THEREOF IN FURNACE

[75] Inventors: Shunichi Sugiyama; Munehiro Ishioka, both of Fukuyama, Japan

[73] Assignee: NKK Corporation, Tokyo, Japan

[21] Appl. No.: 08/796,531

[22] Filed: Feb. 6, 1997

[30] Foreign Application Priority Data

Feb. 14, 1996 [JP] Japan ................................. 8-026705

[51] Int. Cl.⁶ .................................................. F23C 5/00
[52] U.S. Cl. ................................ 431/8; 431/178; 431/167
[58] Field of Search .................................. 431/174, 178, 431/175, 8, 166, 167

[56] References Cited

U.S. PATENT DOCUMENTS

| | | | |
|---|---|---|---|
| 2,847,063 | 8/1958 | Reed et al. | 431/175 |
| 3,180,395 | 4/1965 | Reed | 431/8 |
| 4,496,306 | 1/1985 | Okigami et al. | 431/174 |
| 4,505,666 | 3/1985 | Martin et al. | 431/175 |
| 5,195,884 | 3/1993 | Schwartz et al. | |
| 5,403,181 | 4/1995 | Tanaka et al. | 431/8 |
| 5,441,403 | 8/1995 | Tanaka et al. | 431/175 |
| 5,846,067 | 12/1998 | Nishiyama et al. | 431/173 |

FOREIGN PATENT DOCUMENTS

| | | |
|---|---|---|
| 0 565 196 | 10/1993 | European Pat. Off. |
| 0 756 135 | 1/1997 | European Pat. Off. |
| 56-8921 | 2/1981 | Japan |
| 56-8922 | 2/1981 | Japan |
| 1-167591 | 7/1989 | Japan |
| 1-300103 | 12/1989 | Japan |
| 7-4612 | 1/1995 | Japan |
| 7-4613 | 1/1995 | Japan |

*Primary Examiner*—Carroll B. Dority
*Attorney, Agent, or Firm*—Frishauf, Holtz, Goodman, Langer & Chick, P.C.

[57] ABSTRACT

A combustion burner comprises: an air supply passage for supplying an air to a heating furnace; a primary fuel nozzle for supplying a primary fuel to the air supply passage; secondary fuel nozzles arranged around the air supply port of the air supply passage; and the secondary fuel nozzles being arranged so that a distance L (mm) from an outer periphery of the air supply port to the outer periphery of the secondary fuel supply port is larger than the diameter Da (mm) of the air supply port. A combustion method comprises: injecting fuel substantially from the primary fuel nozzle when an infurnace temperature of the heating furnace is lower than a fuel ignition temperature; and injecting fuel substantially from the secondary fuel nozzle when an infurnace temperature of the heating furnace is higher than a fuel ignition temperature.

16 Claims, 6 Drawing Sheets

COMBUSTION BURNER AND COMBUSTION METHOD THEREOF IN FURNACE

BACKGROUND OF THE INVENTION

1. Field of the Invention

The present invention relates to a combustion burner used in industrial heating furnaces and a combustion method thereof in furnace.

2. Description of the Related Arts

It is well known that the main factors affecting the creation of NOx in exhaust gas is a combustion temperature and an oxygen concentration and the higher is the combustion temperature or the higher is the oxygen concentration, the higher is the NOx concentration in the exhaust gas. Although many methods of suppressing the creation of the NOx gas have been proposed for many years ago, they are roughly classified as a method of changing combustion conditions and a method of changing a combustion method itself.

The former method is a suppression method by (1) combustion with a small amount of oxygen (combustion by a low air ratio), (2) reduction of heat load in a combustion chamber (combustion at low temperature), (3) reduction of combustion air temperature (preheated air temperature), and the like. The latter method is a suppression method by (4) a two-stage combustion method, (5) a off-stoichiometric combustion method, (6) an exhaust gas recycling combustion method, (7) a steam blowing combustion method, and the like. Some of the methods cannot be applied as a method of suppressing NOx gas from the view point of heat efficiency because they lower the heat efficiency.

Figure 6:
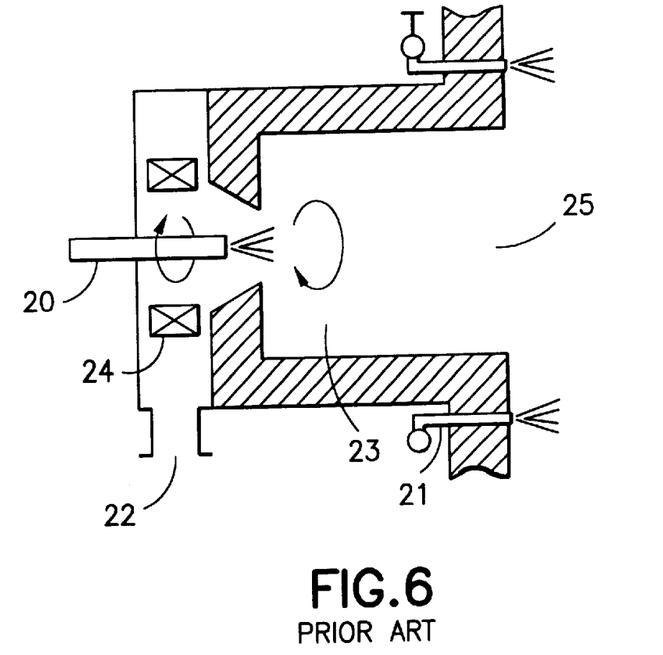
FIG. 6 is a sectional view showing an example of a conventional combustion burner.

A practically used combustion burner for lowering NOx concentration (hereinafter, referred to as a low NOx burner) basically incorporates the functions of the items (4)–(7) of the latter method compactly to realize the reduction of NOx as an overall effect while executing combustion at a low air ratio. For example, Japanese Examined Patent Publication No. 56-8921 and Japanese Examined Patent Publication No. 56-8922 disclose a combustion method embodying these functions (FIG. 6). Further, recently, Japanese Unexamined Patent Publication No. 1-167591, Japanese Unexamined Patent Publication No. 1-300103 (FIG. 7), Japanese Unexamined Patent Publication No. 7-4612, Japanese Unexamined Patent Publication No. 7-4613 (FIG. 8) and the like disclose a combustion method of further lowering the concentration of NOx in exhaust gas by directly blowing fuel into a heating furnace.

Low NOx combustion will be described with reference to FIG. 6 to FIG. 8.

First, the combustion burner of FIG. 6 will be described. A primary fuel nozzle 20 is disposed to an air introduction pipe 22 and secondary fuel nozzles 21 are disposed on both the sides of a precombustion chamber 23. Combustion air is revolved by an air revolving blades 4, mixed with fuel injected from the primary combustion nozzle 20 and precombusted in the precombustion chamber 23. Further, fuel from the secondary fuel nozzles 21 is combusted in a main combustion chamber 25. NOx created by the combustion of the fuel supplied from the secondary fuel nozzles 21 into the main combustion chamber 25 can be greatly reduced by the two-stage combustion method.

Figure 7:
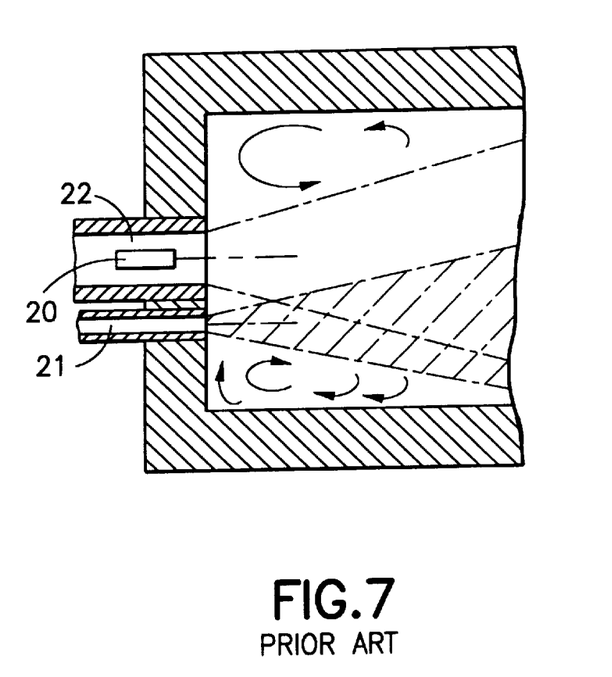
FIG. 7 is a sectional view showing another example of the conventional combustion burner.

The combustion burner of FIG. 7 is arranged such that a primary fuel nozzle 20 is disposed to a combustion air supply port 22 for use in low temperature combustion and secondary fuel nozzles are disposed around the combustion air supply port 22. Exhaust gas in a furnace is rolled in by combustion air and fuel and recombusted to lower NOx.

Figure 8:
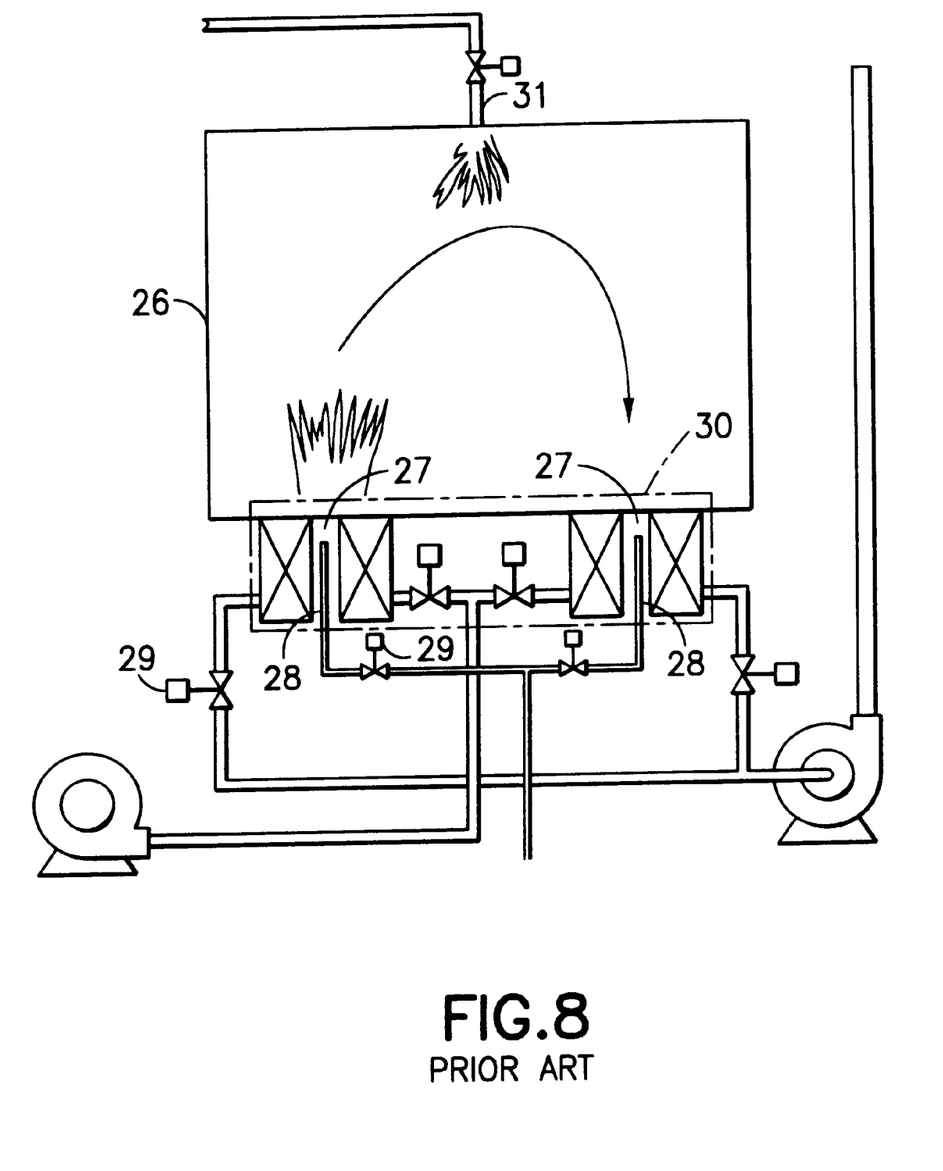
FIG. 8 is a schematic diagram view showing a combustion apparatus using a conventional regenerative burner.

The alternate burner 30 of FIG. 8 is arranged such that a primary combustion nozzle 28 is provided with each pair of regenerative burners 27 and a secondary combustion nozzle 31 carries out secondary combustion by the recirculation thereof while the primary combustion nozzles 28 carry out combustion at low temperature.

However, since the combustion method of the combustion burner of FIG. 8 is a combustion method of directly blowing fuel into a heating furnace, although it is effective for suppressing the creation of NOx, the combustion burner includes the primary fuel nozzle for low temperature combustion in the air supply port thereof to start up the furnace. Thus, there is a tendency that a fuel supply system and other piping system are made complex and further a cooling air pipe is needed to cool a fuel supply port in a high temperature furnace. Consequently, not only the piping system for cooling air and the like is made complex and an initial equipment cost is made expensive but also the piping system for fuel and combustion air, the control system therefor and the improvement of a heating furnace, for example, are required to improve the performance of the heating furnace. However, since the piping system and the like are complex, there is a problem that the improvement is actually limited to a slight degree, thus there is room for improving the combustion burner and the combustion method thereof in the furnace to lower NOx.

In the above low NOx combustion methods, the low NOx combustion burners of FIG. 6 and FIG. 7 are advantageous because they are relatively simple in structure and the performance of the heating furnace can be easily improved only by replacing the combustion burner. However, the combustion methods achieved by the burners are inferior to the combustion method of directly blowing fuel into the furnace shown in FIG. 8 as to the effect for suppressing the creation of NOx. In particular, when an air preheating temperature is increased for the purpose of saving energy, there is a danger that the low temperature combustion of FIG. 6 and FIG. 7 is made to a high temperature combustion state and exceeds a NOx regulating value. Further, since the width of a heating furnace is an important factor for lowering NOx in the combustion burner of FIG. 7, there is a defect that the width of the heating furnace must be improved in accordance with the combustion burner when the burner is employed.

SUMMARY OF THE INVENTION

It is an object of the present invention to provide a combustion burner capable of suppressing the creation of NOx even if combustion is carried out at a high air preheating temperature and a combustion method thereof in a furnace.

To attain the object, the present invention provides a combustion burner comprising:

an air supply passage having an air supply port for supplying air to a heating furnace, the air supply port having a diameter Da (mm);

a primary fuel nozzle having a primary fuel supply port for supplying a primary fuel to the air supply passage;

secondary fuel nozzles having secondary fuel supply ports, which are arranged around the air supply port of the air supply passage, for supplying a secondary fuel; and the secondary fuel nozzles being arranged so that a distance L (mm) from an outer periphery of the air supply port to the outer periphery of the secondary fuel supply port is larger than the diameter Da (mm) of the air supply port.

When the injecting velocity of the combustion air reaches a predetermined velocity, combustion air injected from the air supply port rolls in a furnace exhaust gas and combusts it again. When the secondary fuel nozzles approach the air supply port, the rolled amount of a furnace exhaust gas is reduced and the effect for lowering the amount of NOx by the recombustion of the exhaust gas is decreased. Thus, the NOx amount lowering effect can be achieved by arranging the fuel supply ports of the secondary nozzles so that the distance L (mm) from the outer periphery of the air supply port to the outer periphery of the secondary fuel supply port is larger than the diameter Da (mm) of the air supply port.

It is preferable that the distance L(mm) from the outer periphery of the air supply port to the outer periphery of the secondary fuel supply port is determined in correspondence with the diameter Da of the air supply port according to a velocity of air injected into the heating furnace from the air supply port when the temperature in the heating furnace reaches a temperature which is higher than a fuel ignition temperature. The effect for lowering the amount of NOx in an exhaust gas is achieved by the velocity of air from the air supply port and the factors of the diameter Da and the distance L. When the infurnace temperature of the heating furnace becomes a ignition temperature of the fuel or more, the combustion air is heated to the infurnace temperature and the temperature of the combustion air becomes a ignition temperature of the fuel or more.

It is more preferable that the distance L(mm), the diameter Da (mm) and an actual velocity Va of air injected into the heating furnace from the air supply port satisfy the following relation:

$$(L(Va/V_o)^{1/2})/Da > 10$$

where;
L: distance from the outer periphery of the air supply port to the outer periphery of the fuel supply port of the secondary fuel nozzle (mm)
Va: actual velocity of injected air (m/sec.)
Da: diameter of the air supply port (mm)
Vo: actual unit velocity of injected air (1 m/sec.).

The effect for lowering the amount of NOx in an exhaust gas is achieved by setting the velocity of air from the air supply port, the diameter Da and the distance L based on the above relation.

Further, the present invention provides a combustion method of a burner in furnace comprising the steps of:
(a) providing a combustion burner;
(b) injecting fuel substantially from the primary fuel nozzle and combusting the fuel when an infurnace temperature of the heating furnace is lower than a fuel ignition temperature; and
(c) injecting fuel substantially from the secondary fuel nozzle and combusting the fuel when an infurnace temperature of the heating furnace is higher than a fuel ignition temperature.

The combustion burner comprises: an air supply passage having air supply port for supplying an air to a heating furnace, the air supply port having a diameter Da (mm); a primary fuel nozzle having a primary fuel supply port for supplying a primary fuel to the air supply passage; and secondary fuel nozzles having secondary fuel supply ports, which are arranged around the air supply port of the air supply passage, for supplying a secondary fuel. A distance L (mm) from an outer periphery of the air supply port to the outer periphery of the secondary fuel supply port and the diameter Da (mm) of the air supply port is determined in correspondence with the actual velocity of air injected into the heating furnace from the air supply port.

In the combustion method in furnace, the effect for lowering the amount of NOx in an exhaust gas is achieved by setting the diameter Da and the distance L based on the velocity of air from the air supply port as well as controlling the combustion state of the primary fuel nozzle and the secondary fuel nozzles.

In the combustion method in furnace, it is preferable that the distance L(mm), the diameter Da (mm) and an actual velocity Va of air injected into the heating furnace from the air supply port satisfy the following relation:

$$(L(Va/V_o)^{1/2})/Da > 10$$

where;
L: distance from the outer periphery of the air supply port to the outer periphery of the fuel supply port of the secondary fuel nozzle (mm)
Va: actual velocity of injected air (m/sec.)
Da: diameter of the air supply port (mm)
Vo: actual unit velocity of injected air (1 m/sec.).

The step (b) of injecting fuel can comprise injecting fuel only from the primary fuel nozzle or injecting fuel mainly from the primary fuel nozzle.

The effect for lowering NOx in an exhaust gas is achieved by setting the diameter Da and the distance L based on the velocity of air from the air supply port as well as controlling the combustion state of the primary fuel nozzle and the secondary fuel nozzles based on the above relation.

DESCRIPTION OF THE EMBODIMENT

An embodiment according to the present invention will be described below with reference to the drawings.

Figures 1A, 1B:
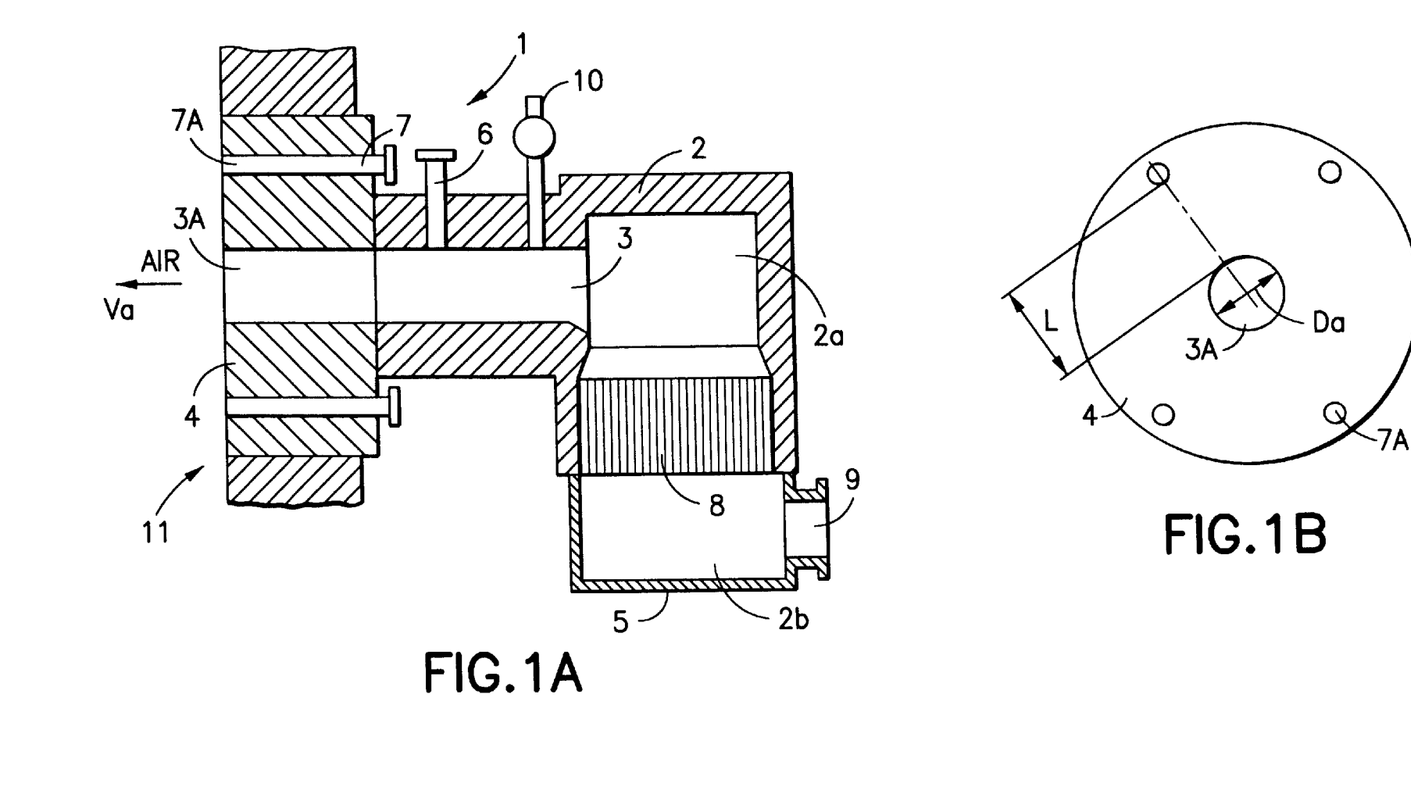
FIG. 1A is a cross sectional view showing an embodiment of a combustion burner according to the present invention.
FIG. 1B is a front elevational view of the combustion burner.

FIG. 1 shows a regenerative burner as an embodiment of a combustion burner, wherein FIG. 1A is a cross sectional view of the combustion burner and FIG. 1B is a front elevational view thereof. In the drawing, a regenerative burner 1 is arranged such that a regenerative body 8 is accommodated in a heat resistant regenerative body accommodating vessel 2, an upper space 2a is formed on the regenerative body 8, and a wind box 5 is mounted under the regenerative body 8 and forms a lower space 2b. An air supply passage 3 communicating with the upper space 2a of the regenerative body accommodating vessel 2 communicates with a burner tile 4 and a flow in/out port 9 is disposed to the lower space 2b. The burner tile 4 is mounted on the side wall of a heating furnace 11. A primary fuel nozzle 6 and a pilot burner 10 are disposed to the air supply passage 3 and a plurality of secondary fuel nozzles 7 are disposed to the burner tile 4. The air supply port 3A of the air supply passage 3 and fuel supply ports 7A are opened to the inside of the heating furnace and the distance L from the outer periphery of the air supply port 3A to the outer periphery of the fuel supply port 7A of the secondary fuel nozzle 7 is set approximately at least 1.0 time the diameter Da of the air supply port 3A.

Figure 2:
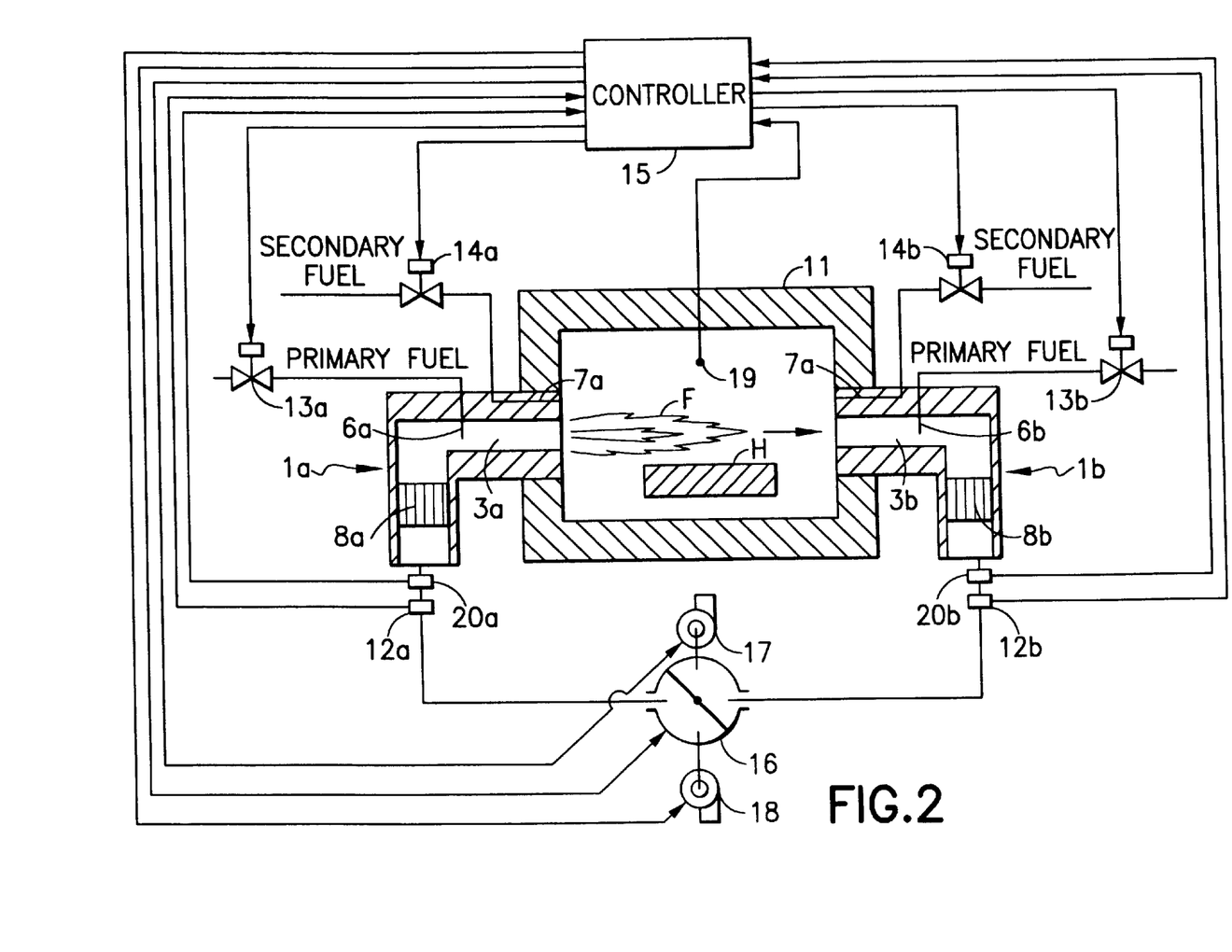
FIG. 2 is a schematic diagram containing a sectional view showing an embodiment in which the combustion burner according to the present invention is mounted.

FIG. 2 is a schematic view showing an embodiment of the piping system and the control system of the combustion burner mounted on the heating furnace 11. In the drawing, regenerative burners 1a, 1b for alternately carrying out combustion are mounted on the furnace wall of the heating furnace 11. A heating material H such as a steel or the like is charged into the heating furnace 11 and F denotes flame. Regenerative bodies 8a, 8b are accommodated in the regenerative burners 1a, 1b, respectively. The fuel supply ports of primary fuel nozzles 6a, 6b are opened to air supply passage 3a, 3b, respectively and the fuel supply ports of secondary fuel nozzles 7a, 7b are opened to the inside of the furnace. Fuel shut-off valves 13a, 13b are disposed to the primary fuel nozzles 6a, 6b for supplying a primary fuel into the air supply passage 3a, 3b, respectively and fuel shut-off valves 14a, 14b are disposed to the secondary fuel nozzles 7a, 7b for supplying a secondary fuel into the furnace, respectively. An exhaust gas is discharged to the outside of the furnace and combustion air is supplied into the furnace by blowers 17, 18 through a piping and a switching valve 16. Current-meters 12a, 12b and NOx gas sensors 20a, 20b are disposed to the piping and a temperature sensor 19 is disposed in the heating furnace 11. The outputs from the current-meters 12a, 12b, the temperature sensor 19 and the NOx gas sensors 20a, 20b are supplied to a controller 15. Further, the controller 15 controls the fuel shut-off valves 13a, 13b, 14a, 14b according to alternate combustion, the switching operation of the switching valve 16 and the drive and the number of revolution of the blowers 17, 18. Note, the current-meters 12a, 12b and the NOx gas sensors 20a, 20b may be disposed to the air supply passage 3a, 3b or the discharge side of the exhaust gas.

Next, a method of combustion of the combustion burner mounted to a furnace therein will be described based on the combustion control flowchart of FIG. 3 with reference to FIG. 1 and FIG. 2.

First, at step 1, the pilot burner 10 is ignited, the primary fuel is supplied to the air supply passage 3 from the primary fuel nozzles 6a, 6b to start the alternate combustion of the regenerative burners 1a, 1b and combustion and the discharge the exhaust gas are alternately carried out. Subsequently, the temperature in the heating furnace 11 is measured based on the output from the temperature sensor 19 at step S2 and the process goes to step S3. At step S3, whether the furnace temperature is lower than a fuel ignition temperature (low temperature) or not is determined based on a condition (furnace temperature<fuel ignition temperature) (1). When the condition (1) is satisfied, the process goes to step S4 and continues the combustion by supplying the primary fuel into the air supply passage 3 by the primary fuel nozzles 6a, 6b and then returns to step S2. When the condition (1) is not satisfied at step S3, the process goes to step S5 and whether the furnace temperature reaches a temperature higher than the fuel ignition temperature (high temperature) or not is determined based on a condition (furnace temperature≧fuel ignition temperature) (2). When the condition (2) is not satisfied, the process returns to step S4 and continues the combustion by the primary fuel nozzle 6a, 6b. When the condition (2) is satisfied, the process goes to step S6 and starts combustion by the secondary fuel nozzles 7a, 7b. Subsequently, the process goes to step S7 and measures the NOx concentration in the exhaust gas by the NOx gas sensors 20a, 20b and then the process goes to step S8. At step S8, whether the NOx concentration is lower than a reference value or not is determined. When the NOx concentration is within the reference value, the process returns to step S5. When the NOx concentration exceeds the reference value, the process goes to step S9 and adjusts the injecting velocity of combustion air injected from the air supply ports 3a, 3b into the furnace. Subsequently, the process goes to step S10 to determine whether the operation of the heating furnace is continued or not. When it is continued, the process returns to step S5 and repeats the same operation and controls the combustion so that the NOx concentration is within the reference value by adjusting the injecting velocity of the combustion air. When the operation of the furnace is finished, the combustion control is completed. It is of course apparent that the combustion may be continued by supplying the fuel from the primary fuel nozzle 6a, 6b to the air supply passage 3a, 3b in the state that the secondary fuel nozzles 7a, 7a are burnt.

Figure 4:
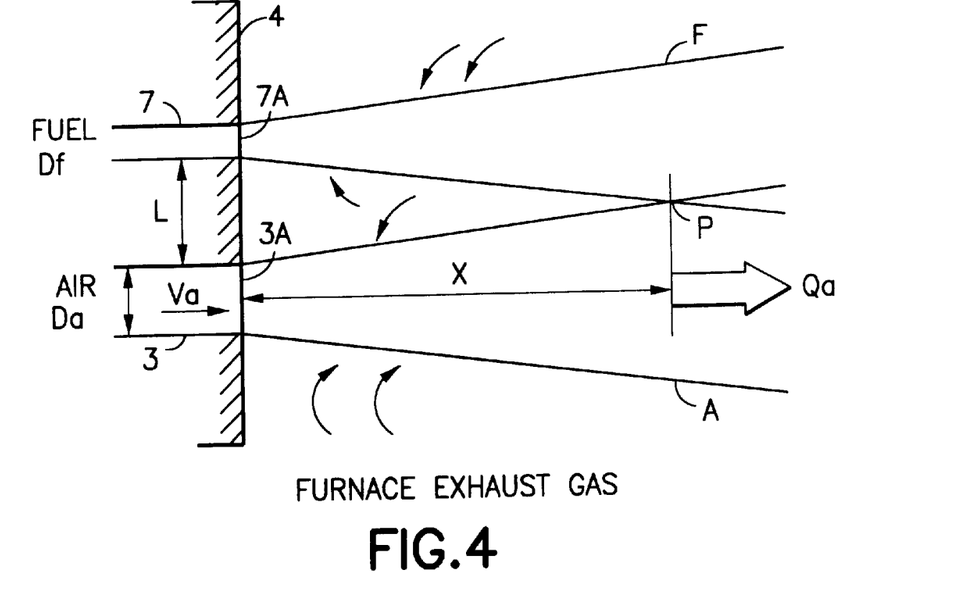
FIG. 4 is a schematic view showing a combusting state.

Next, combustion in the furnace by the combustion burner in the embodiment will be described with reference to FIG. 4. The drawing shows the air supply passage 3 and the fuel nozzle 7 each opened to the inside of the furnace from the burner tile 4 and further schematically shows the direction in which combustion air A and a secondary fuel F are injected. The diameter of the air supply port 3A is represented by Da and the distance between the outer periphery of the air supply passage 3 and the outer periphery of the fuel nozzle 7 is represented by L. NOx is lowered in such a manner that a furnace exhaust gas is recombusted by being rolled in by the combustion air A which comes into contact with the fuel at the position a distance X apart from the air supply port 3A. Therefore, since the furnace exhaust gas is insufficiently rolled in when the distance L between the outer periphery of the air supply passage 3 and the outer periphery of the fuel nozzle 7 is short, the distance L is preferably set at least 1.0 time the diameter Da. It is needless to say that when the outer periphery of the air supply passage 3 is abnormally spaced apart from the outer periphery of the fuel nozzle 7, the effect for lowering NOx is reduced because the furnace exhaust gas is insufficiently rolled in.

Further, to describe additionally, a factor for managing the NOx concentration is a flame temperature. The flame temperature is managed by the rolled amount Q of the furnace exhaust gas in the distance X up to a combustion start point and a furnace exhaust gas temperature T. Therefore, the NOx concentration depends on the rolled amount Q of the furnace exhaust gas and the furnace exhaust gas temperature T.

That is, it is known that the rolled amount Q of the furnace exhaust gas is the function of a combustion air injecting velocity Va, the injection diameter Da and the distance X from the air supply port 3A to the combustion start point P. FIG. 4 schematically shows the extents of a jet air stream and a jet fuel stream and the mixing position (combustion start point) P. Since the extending angles of a jet combustion air stream and a jet secondary fuel stream are approximately constant regardless of the injected state thereof, the distance X from the air supply port to the mixing start point P is approximately proportional to the distance L between the outer periphery of the air supply port and the outer periphery of the fuel supply port. As shown in the drawing, in a jet stream which is symmetrical with respect to an axis, the total amount Qa of a jet stream passed through the distance X from the jet stream injection port including a rolled gas is proportional to the distance X. Thus, the total amount Qa of the jet stream passed is proportional to the distance L. Consequently, when it is assumed that a furnace temperature is constant, the NOx concentration changes depending upon the injected air velocity, the injection diameter of combustion air and the distance L from the outer periphery of the air supply port to the outer periphery of the fuel supply port.

Taking the above into consideration, the inventors executed an experiment by changing the injected air velocity Va within the range of 10–150 m/second, the diameter Da of the air supply port within the range of 30–160 mm and the distance L from the outer periphery of the air supply port to the outer periphery of the fuel supply port within the range of 10–800 mm while adjusting the amount heat removed by a cooling water pipe so that a furnace temperature was kept constant. Note, the NOx concentration in an exhaust gas was measured by converting the oxygen ($O_2$) concentration in the NOx concentration into 11%.

Figure 5:
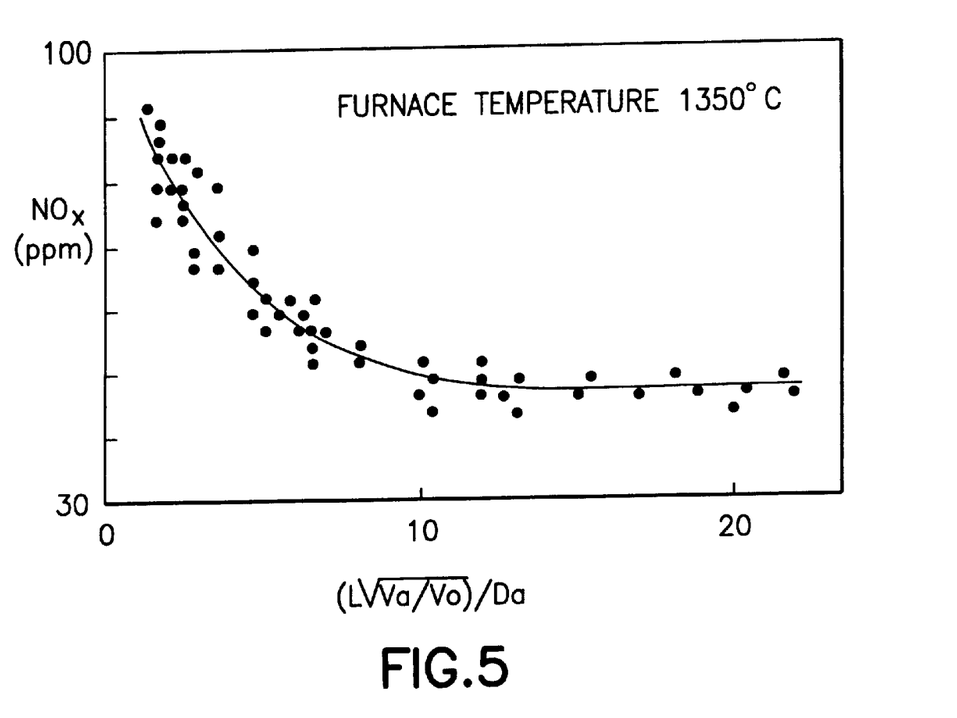
FIG. 5 is a graph showing the result of measurement of NOx.

FIG. 5 shows the result of examination of the effect of respective factors obtained from the measured data. The abscissa of the drawing represents a value using $(L(Va/V_0)^{1/2})/Da$ as a parameter and the ordinate thereof represents NOx concentration (ppm). As apparent from the distribution curve of the NOx concentration, the drawing shows that when $(L(Va/V_0)^{1/2})/Da$ is used as the parameter, the NOx concentration is distributed on a unified distribution curve. As apparent from the drawing, it is found that when the value of $(L(Va/V_0)^{1/2})/Da$ is less than 10, the NOx concentration abruptly increases, whereas when it is 10 or more, the NOx concentration is in a saturated state in which it does not almost change. Therefore, this means that when respective parameters are set to satisfy $(L(Va/V_0)^{1/2})/Da>10$, a low NOx burner can be formed.

Note, the dimensions of the respective parameters in $(L(Va/V_0)^{1/2})/Da$ are as shown below. The distance from the outer periphery of the air supply port to the outer periphery of the fuel supply port is shown by (mm), the actual injected air velocity is shown by (m/s) and the diameter Da of the air supply port is shown by (mm). A unit actual injected air velocity Vo is shown by (1 m/s) which is used to eliminate a unit from the actual injected air velocity.

Although FIG. 5 shows data only when the furnace temperature is 1350° C., when the furnace temperature is 900° C., or higher, there is a tendency that the NOx concentration is made higher as the furnace temperature increases. However, it is confirmed that when the parameter is at least 10, the NOx concentration is approximately constant. From the above mentioned, it becomes apparent that the NOx concentration can be greatly lowered by making combustion so as to satisfy the following relation (1).

$$(L(Va/V_0)^{1/2})/Da>10 \qquad (1)$$

Therefore, when the velocity Va of air injected from the air supply port 3A and the diameter Da of the air supply port 3A are given in the combustion burner shown in FIG. 1, a low NOx burner can be easily arranged by setting the distance L based on the above relation. Further, when the diameter Da of the air supply port 3A and the distance L are given, a low NOx burner can be arranged by adjusting the injected air velocity Va.

Further, although it is apparent that the above combustion method is very effective to lower the NOx concentration, since the distance L between the air supply port and the fuel supply port must be increased, combustion is not carried out when the furnace temperature is below the self-ignition temperature of fuel, although there is no problem when the furnace temperature is higher than the self-ignition temperature. Thus, the fuel supply port of primary fuel nozzle must be also opened in the air supply port together with the pilot burner, which results in the formation of the combustion burner of the embodiment shown in FIG. 1.

Figure 3:
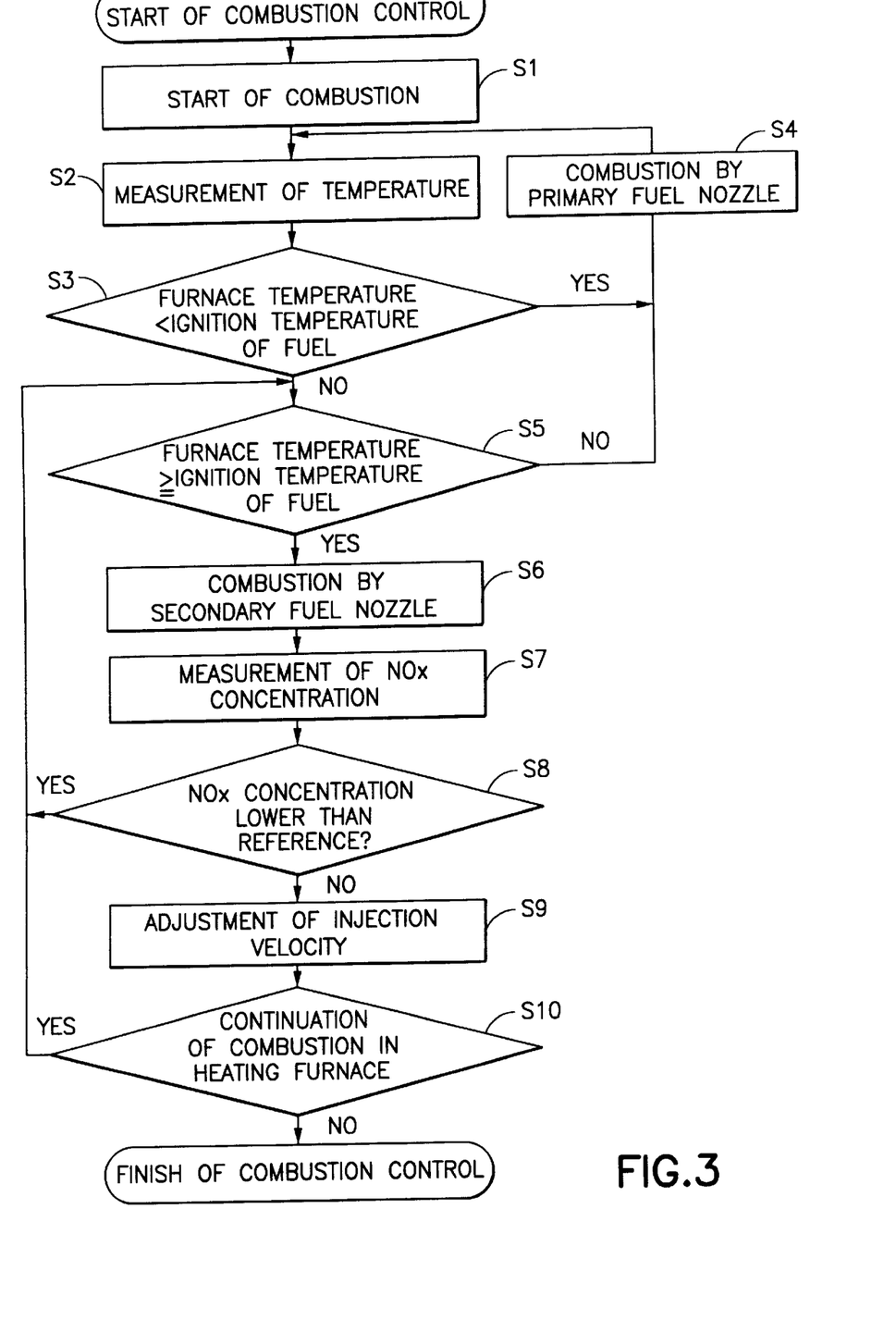
FIG. 3 is a view showing a combustion control flowchart.

Although the above description is made based on the combustion control flowchart of FIG. 3, when the furnace temperature is lower than the self-ignition temperature of fuel in the described structure, fuel is combusted by being "mainly" injected from the fuel supply ports of the primary fuel nozzles and when the furnace temperature reaches a temperature higher than the self-ignition temperature of fuel, fuel is combusted by being "mainly" supplied from the fuel supply ports of the secondary fuel nozzles outside of the air supply port.

The term "mainly" is used because fuel may be supplied from all the fuel supply ports depending upon the NOx concentration, fuel control in operation and the like and the term means that combustion by the primary and secondary nozzles is also included, that is, the combusting state of "100%" is also included.

It is needless to say that when the furnace is at a low temperature which is lower than the self-ignition temperature of fuel, no problem arises because the NOx concentration is low in any combustion method. However, even if combustion is executed at a high temperature, low NOx combustion can be achieved by controlling combustion so as to satisfy $(L(Va/V_0)^{1/2})/Da>10$. The value "10" of the parameter has a characteristic that the distribution curve of the NOx concentration abruptly rises approximately at the value "10", although the value somewhat changes depending upon the heating value of fuel. However, since the value of the parameter slightly changes according to the heating value of fuel, the parameter is not always limited to the value "10".

Although the above embodiment is described as the combustion burner including the regenerative body, it is apparent that even a combustion burner without the regenerative body can lower the NOx concentration in an exhaust gas so long as the combustion burner includes primary and secondary fuel nozzles as described above and is arranged to set respective parameters according to the concept based on the parameter of $(L(Va/V_0)^{1/2})/Da$.

Further, even a combustion burner in which the diameter Da of the air supply port 3A and the distance L from the air supply port 3A to the fuel supply port 7A are fixed can lower the NOx concentration in a furnace exhaust gas without the need of improving a heating furnace by adjusting the velocity Va of air injected from the air supply port 3A using the combustion method in furnace as described above. In addition, a low NOx burner can be arranged only by adjusting the position of the fuel supply ports 7A.

As described above, according to the present invention, there is an advantage that low NOx combustion can be achieved without the improvement of a heating furnace itself and the control system and the piping system thereof.

According to the present invention, there is an advantage that when the air supply velocity Va is constant, a combustion burner capable of achieving low NOx combustion can be provided by arranging the combustion burner so as to set the value of $(L(Va/V_0)^{1/2})/Da$ to, for example, at least "10". On the contrary, there is an advantage that when the diameter Da of the injected air supply port and the distance L from the outer periphery of the injected air supply port to the outer periphery of the fuel supply port of the secondary fuel nozzle are set, a combustion burner capable of making the NOx concentration below a reference value can be provided by controlling furnace combustion so as to adjust the air supply velocity Va of air injected from the air supply port.

According to the present invention, there is an advantage that a combustion burner capable of obtaining a certain NOx lowering effect can be provided by satisfying the condition $(L(Va/V_0)^{1/2})/Da>10$, thus there is an advantage that when a predetermined temperature distribution is designed in a furnace, a degree of freedom of design capable of freely disposing a combustion burner is increased as compared with a conventional method of achieving low NOx in a furnace by directly blowing fuel into the furnace.

Further, according to the present invention, there is an advantage that the performance of a heating furnace can be improved only by replacing an existing combustion burner with a low NOx burner.

What is claimed is:

1. A regenerative burner for a heating furnace comprising:
   an air supply passage including a regenerative body and having an air supply port for supplying air to a heating furnace, the air supply port having a diameter Da in mm;
   a primary fuel nozzle having a primary fuel supply port for supplying a primary fuel to the air supply passage; and a plurality of secondary fuel nozzles each having a secondary fuel supply port; the secondary fuel nozzles are arranged around the air supply port of the air supply passage, for supplying a secondary fuel;
   the secondary fuel nozzles being arranged so that a distance L in mm from a periphery of the air supply port to a periphery of the secondary fuel supply ports is larger than the diameter Da in mm of the air supply port.

2. A combustion method for a burner in a heating furnace comprising:
   (a) providing a regenerative burner in a heating furnace, the regenerative burner comprising:
      an air supply passage including a regenerative body and having an air supply port for supplying air to a heating furnace, the air supply port having a diameter Da in mm;
      a primary fuel nozzle having a primary fuel supply port for supplying a primary fuel to the air supply passage; and
      a plurality of secondary fuel nozzles each having a secondary fuel supply port, the secondary fuel nozzles are arranged around the air supply port of the air supply passage, for supplying a secondary fuel;
   (b) arranging the secondary fuel nozzles so that a distance L in mm from a periphery of the air supply port to a periphery of the secondary fuel supply ports is larger than the diameter Da in mm of the air supply port; and
   (c) determining the distance L in mm from the periphery of the air supply port to the periphery of the secondary fuel supply port and the diameter Da in mm of the air supply port in correspondence with an actual velocity of air injected into the heating furnace from the air supply port.

3. The combustion method of claim 2, wherein the distance L in mm, the diameter Da in mm and the actual velocity Va of air injected into the heating furnace from the air supply port satisfy the following relation:

$$(L(Va/V_0)^{1/2})/Da>10$$

where

L is the distance from the outer periphery of the air supply port to the outer periphery of the fuel supply port of the secondary fuel nozzle in mm, Va is the actual velocity of injected air in m/second, Da is the diameter of the air supply port in mm, and Vo is an actual unit velocity of injected air which is measured in a unit of 1 m/second.

4. The combustion method of claim 2, which further comprises (I) injecting fuel substantially from the primary fuel nozzle and combusting fuel when an infurance temperature of the heating furnace is lower than a fuel ignition temperature, and (ii) injecting fuel substantially from the secondary fuel nozzle and combusting the fuel when an infurnace temperature of the heating furnace is higher than a fuel ignition temperature.

5. The combustion method of clam 2, which further comprises injecting fuel substantially from the primary fuel nozzle and combusting fuel when an infurance temperature of the heating furnace is lower than a fuel ignition temperature.

6. The regenerative burner of claim 1, wherein there are four secondary fuel nozzles.

7. The regenerative burner of claim 1, wherein the Da is 30 to 160 mm.

8. The regenerative burner of claim 1, which further comprises a heat resistant regenerative body accommodating vessel comprising a regenerative body, an upper space disposed above the regenerative body and a wind box disposed below the regenerative body, wherein the upper space communicates with the air supply passage and the wind box communicates with a port to permit flow in and out of the wind box.

9. The regenerative burner of claim 8, wherein there are four secondary fuel nozzles and the Da is 30 to 160 mm.

10. The method of claim 2, wherein the Da is 30 to 160 mm.

11. The method of claim 3, wherein the actual velocity of injected air is 10 to 150 m/second.

12. The method of claim 11, wherein a temperature in the furnace is 900° C. or higher.

13. The method of claim 12, wherein the temperature in the furnace is 1350° C.

14. The regenerative burner of claim 1, wherein the L is 10 to 800 mm.

15. The regenerative burner of claim 8, wherein the L is 10 to 800 mm.

16. The regenerative burner of claim 2, wherein the L is 10 to 800 mm.

* * * * *